(12) United States Patent
Clum et al.

(10) Patent No.: US 9,752,447 B2
(45) Date of Patent: Sep. 5, 2017

(54) ANGLED RAIL HOLES

(71) Applicant: UNITED TECHNOLOGIES CORPORATION, Hartford, CT (US)

(72) Inventors: Carey Clum, East Hartford, CT (US); Jonathan Perry Sandoval, Hebron, CT (US)

(73) Assignee: United Technologies Corporation, Hartford, CT (US)

( * ) Notice: Subject to any disclaimer, the term of this patent is extended or adjusted under 35 U.S.C. 154(b) by 181 days.

(21) Appl. No.: 14/656,446

(22) Filed: Mar. 12, 2015

(65) Prior Publication Data
US 2016/0177758 A1 Jun. 23, 2016

Related U.S. Application Data

(60) Provisional application No. 61/975,150, filed on Apr. 4, 2014.

(51) Int. Cl.
F23R 3/06 (2006.01)
F01D 5/08 (2006.01)
(Continued)

(52) U.S. Cl.
CPC .............. F01D 9/023 (2013.01); F01D 5/081 (2013.01); F02C 7/18 (2013.01); F23R 3/06 (2013.01);
(Continued)

(58) Field of Classification Search
CPC .... F23R 3/002; F23R 3/06; F23R 3/08; F23R 2900/03041; F23R 2900/03042;
(Continued)

(56) References Cited

U.S. PATENT DOCUMENTS 3,965,066 A * 6/1976 Sterman ................ F01D 9/023
 415/115
4,739,621 A * 4/1988 Pettengill ................ F01D 9/023
 415/175
(Continued)

FOREIGN PATENT DOCUMENTS

EP 1741877 A1 * 1/2007 ............. F01D 5/143
EP 1813869 8/2007
(Continued)

OTHER PUBLICATIONS

Extended European Search Report dated Oct. 28, 2015 in European Application No. 15161313.0.

Primary Examiner — Pascal M Bui Pho
Assistant Examiner — Rene Ford
(74) Attorney, Agent, or Firm — Snell & Wilmer L.L.P.

(57) ABSTRACT

A gas turbine engine combustor configured to cool a first vane platform by directing airflow through an aft combustor rail is disclosed. In various embodiments, a gas turbine engine combustor may comprise an aft combustor rail connected between an outer wall of an outer liner and an aft heat shield panel, and a plurality of holes in the aft combustor rail. The aft combustor rail may be positioned near an outer vane platform of a first vane stage of a turbine. Further, the plurality of holes may be designed to focus pass-through airflow onto the outer vane platform. In various embodiments, each hole of the plurality of holes may be angled between 20°-90° relative to the aft combustor rail. Additionally, the plurality of holes may be angled to converge the airflow to a focused area, such as a leading edge vane airfoil of the first vane stage.

16 Claims, 6 Drawing Sheets

(51) Int. Cl.
*F01D 9/02* (2006.01)
*F02C 7/18* (2006.01)

(52) U.S. Cl.
CPC ......... *F05D 2240/81* (2013.01); *Y02T 50/672* (2013.01); *Y02T 50/675* (2013.01)

(58) Field of Classification Search
CPC .. F23R 2900/03044; F23R 2900/03043; F05D 2260/201; F05D 2240/81; F01D 9/023; F01D 9/047; F01D 9/06; F01D 5/081; F01D 5/082; F01D 25/12
See application file for complete search history.

(56) References Cited

U.S. PATENT DOCUMENTS

| | | | | |
|---|---|---|---|---|
| 5,307,637 A | * | 5/1994 | Stickles | F23R 3/002 60/756 |
| 5,398,496 A | * | 3/1995 | Taylor | F01D 9/023 60/752 |
| 5,407,319 A | * | 4/1995 | Harrogate | F01D 9/023 415/115 |
| 6,082,961 A | * | 7/2000 | Anderson | F01D 5/08 415/115 |
| 6,616,405 B2 | * | 9/2003 | Torii | F01D 5/186 415/914 |
| 7,452,184 B2 | * | 11/2008 | Durocher | F01D 5/081 415/115 |
| 7,857,580 B1 | * | 12/2010 | Liang | F01D 9/06 415/115 |
| 8,388,307 B2 | * | 3/2013 | Smoke | F01D 9/02 415/134 |
| 8,534,076 B2 | * | 9/2013 | Woodcock | F01D 9/023 415/138 |
| 8,783,044 B2 | * | 7/2014 | Steiger | F01D 5/186 415/115 |
| 2003/0101731 A1 | * | 6/2003 | Burd | F23M 5/02 60/796 |
| 2005/0086940 A1 | * | 4/2005 | Coughlan, III | F23R 3/002 60/752 |
| 2007/0095067 A1 | * | 5/2007 | Alkabie | F01D 9/023 60/772 |
| 2009/0077977 A1 | * | 3/2009 | Cayre | F23R 3/06 60/757 |
| 2011/0185739 A1 | | 8/2011 | Bronson et al. | |
| 2014/0030064 A1 | | 1/2014 | Bangerter et al. | |

FOREIGN PATENT DOCUMENTS

| | | | |
|---|---|---|---|
| EP | 1818612 | 8/2007 | |
| GB | 2298266 A | * 8/1996 | ............. F23R 3/002 |

* cited by examiner

ANGLED RAIL HOLES

CROSS-REFERENCE TO RELATED APPLICATIONS

This application is a nonprovisional of, and claims priority to, and the benefit of U.S. Provisional Application No. 61/975,150, entitled "ANGLED RAIL HOLES," filed on Apr. 4, 2014, which is hereby incorporated by reference in its entirety.

FIELD

The present disclosure relates to first vane platform cooling, and specifically to first vane platform cooling by directing airflow from a combustor rail.

BACKGROUND

In gas turbine engines, distress on a first vane platform may not be solved by simply adding vane platform cooling holes. Further, combustors and turbines may be designed separately, which can lead to inefficient performance and inefficient cooling, particularly of the first vane platform. In the prior art, if airflow is directed from a combustor portion to the first vane platform, the airflow is non-directional and inefficient.

SUMMARY

A gas turbine engine combustor configured to cool a first vane platform by directing airflow through an aft combustor rail is disclosed. In various embodiments, a gas turbine engine combustor may comprise an aft combustor rail connected between an outer wall of an outer liner and an aft heat shield panel, and a plurality of holes in the aft combustor rail. The aft combustor rail may be positioned near an outer vane platform of a first vane stage of a turbine. Further, the plurality of holes may be designed to focus pass-through airflow onto the outer vane platform. In various embodiments, each hole of the plurality of holes may be angled between 20°-90° relative to the aft combustor rail. Additionally, the plurality of holes may be angled to converge the airflow to a focused area, such as a leading edge vane airfoil of the first vane stage.

According to various embodiments, the plurality of holes may be parallel to the aft heat shield panel. According to various embodiments, the plurality of holes may be angled non-parallel to the aft heat shield panel. Each hole of the plurality of holes may be circular-shaped. One or more holes of the plurality of holes may be elliptical-shaped. One or more holes of the plurality of holes may have a diameter in a range of approximately 1 mil to 100 mils. One or more holes of the plurality of holes may have a length-to-diameter ratio of 1:10. The airflow through the plurality of holes may be diverted from an outer annular chamber of the gas turbine engine combustor.

Moreover, in various embodiments, a gas turbine engine combustor may comprise an aft combustor rail connected between an outer wall of an outer liner and an aft heat shield panel, a first hole array in the aft combustor rail, a second hole array in the aft combustor rail adjacent to the first hole array. The aft combustor rail may be positioned near an outer vane platform of a first vane stage of a turbine, and the second hole array may be positioned between two adjacent vane airfoils of the first vane stage. Further, the first hole array may comprise multiples holes angled to converge pass-through airflow to a focused area, such as a leading edge vane airfoil of the first vane stage.

According to various embodiments, the focused area of the first hole array may be a pressure side of a vane airfoil of the first vane stage. The angle and a spacing of holes of at least one of first hole array or the second hole array may creates swirling airflow about the vane airfoil. A spacing of multiple holes of the second hole array may be greater than a spacing of the multiple holes of the first hole array. Each hole of the multiple holes of the first hole array may be angled between 20°-90° relative to the aft combustor rail. One or more holes of the first hole array may have a diameter in a range of approximately 1 mil to 100 mils. One or more holes of the first hole array may have a length-to-diameter ratio of 1:10.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion.

Figure 1:
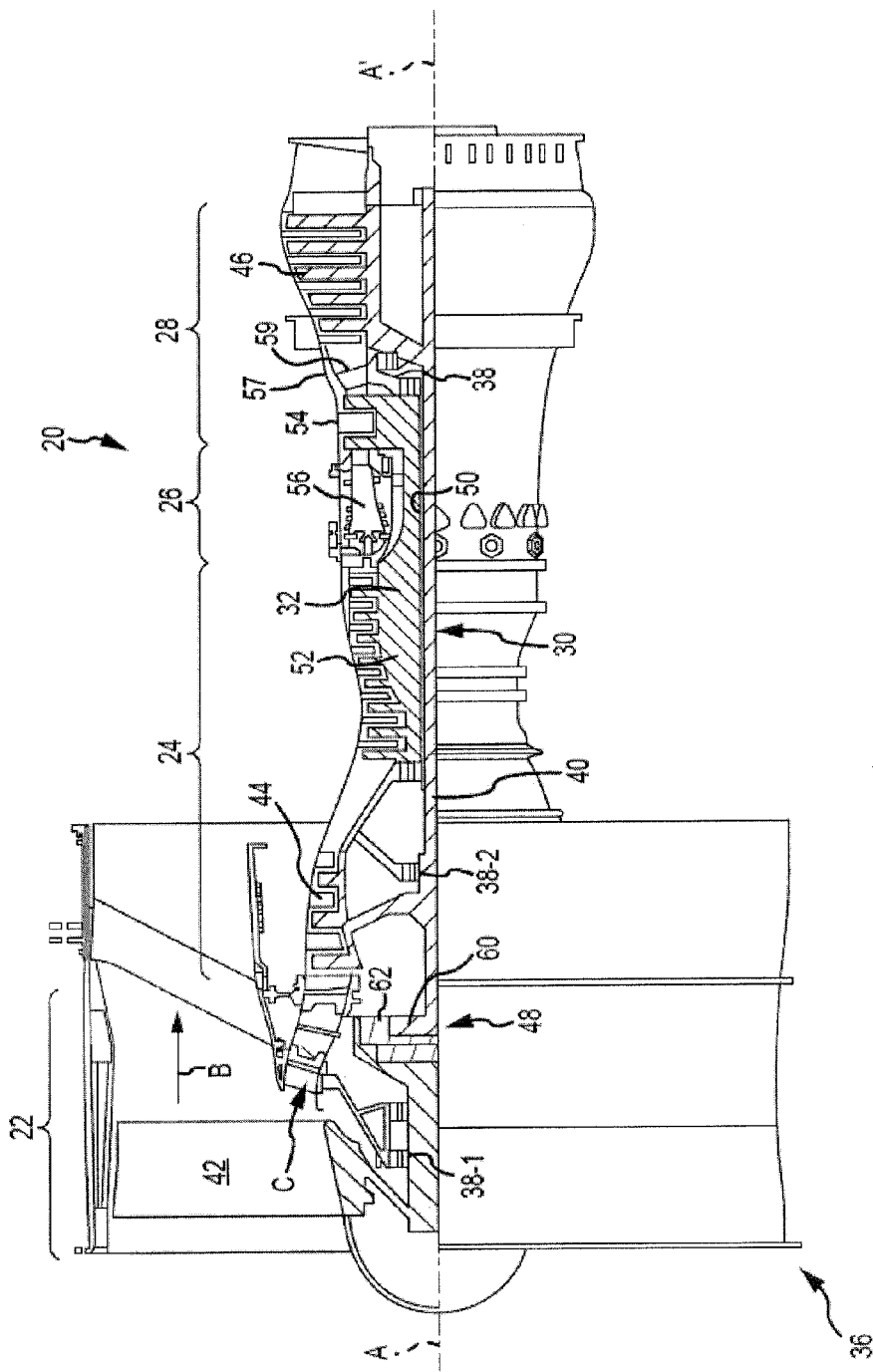
FIG. 1 is cross-sectional view of an exemplary gas turbine engine in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive air along a bypass flow-path B while compressor section 24 can drive air along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 and a low pressure (or first) turbine section 46. Inner that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure (or second) compressor section 52 and high pressure (or second) turbine section 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor section 44 then high pressure compressor 52, mixed and burned with fuel in combustor 56, then expanded over high pressure turbine 54 and low pressure turbine 46. Mid-turbine frame 57 includes airfoils 59 which are in the core airflow path. Turbines 46, 54 rotationally drive the respective low speed spool 30 and high speed spool 32 in response to the expansion.

Gas turbine engine 20 may be, for example, a high-bypass geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Gear architecture 48 may have a gear reduction ratio of greater than about 2.3 and low pressure turbine 46 may have a pressure ratio that is greater than about 5. In various embodiments, the bypass ratio of gas turbine engine 20 is greater than about ten (10:1). In various embodiments, the diameter of fan 42 may be significantly larger than that of the low pressure compressor section 44, and the low pressure turbine 46 may have a pressure ratio that is greater than about 5:1. Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other turbine engines including direct drive turbofans.

Figure 2:
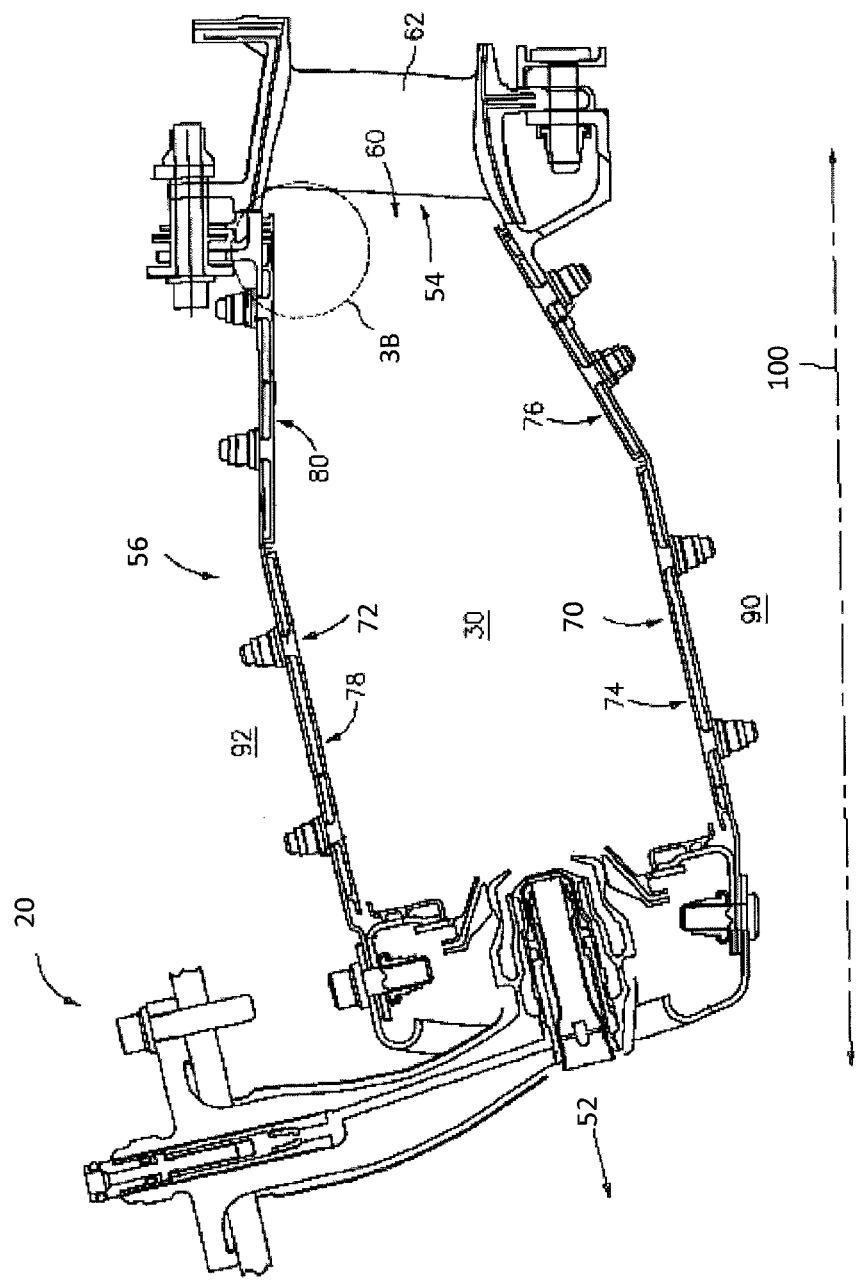
FIG. 2 is cross-sectional view of an exemplary combustor in accordance with various embodiments.

FIG. 2 shows an exemplary combustor 56 positioned between compressor 52 and turbine section 54 of a gas turbine engine 20 having a central longitudinal axis or centerline 100. The exemplary heat shields are formed as multiple circumferential arrays (rings) of panels (e.g., inboard forward and aft panels 74 and 76 and outboard forward and aft panels 78 and 80). Exemplary panel and shell material are high temperature or refractory metal superalloys that may be coated with a thermal and/or environmental coating. Alternate materials include ceramics and ceramic matrix composites. Various known or hereinafter developed other materials and manufacturing techniques may be utilized. In known fashion or otherwise, the panels may be spaced apart from the interior surface of the associated shell. The exemplary shells and panels may be foraminate, passing cooling air from annular chambers 90 and 92 respectively through inboard and outboard of the walls 70 and 72 into the combustion chamber 30. The exemplary panels may be configured so that the intact portions of their inboard surfaces are substantially frusto-conical. Viewed in longitudinal section, these surfaces appear as straight lines at associated angles to the axis 100. A combusting mixture is driven downstream within the combustor 56 to a combustor outlet 60 immediately ahead of a fixed first vane stage 62 of high pressure turbine 54.

Figure 3A:
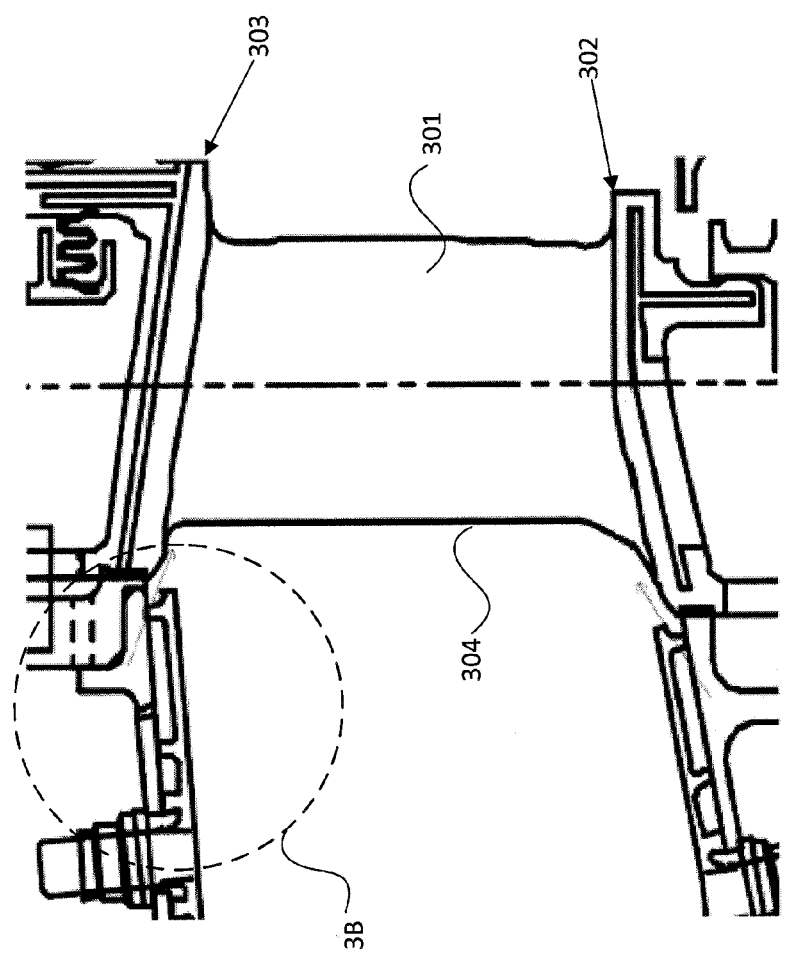
FIG. 3A is cross-sectional view of an exemplary combustor outlet section in accordance with various embodiments.
Figure 3B:
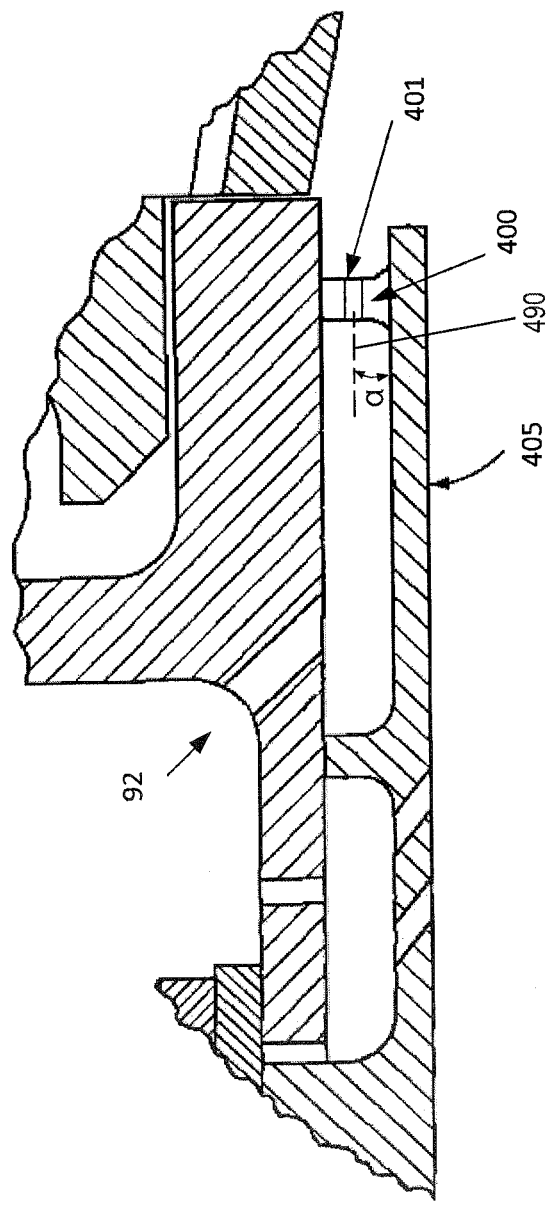
FIG. 3B is an enlarged view of an aft portion of an outboard wall in accordance with various embodiments.
Figure 4:
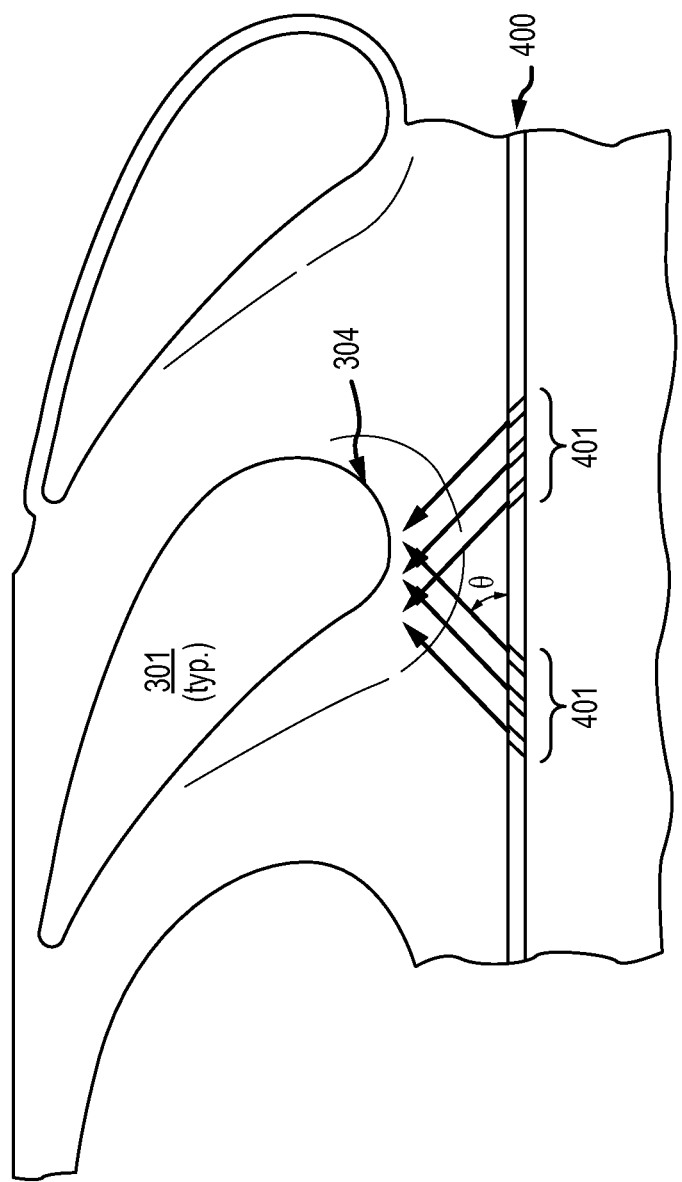
FIG. 4 is a cross-sectional view of an exemplary first vane stage and aft combustor rail in accordance with various embodiments.

Furthermore, high pressure turbine 54 may comprise multiple vane stages. With reference to FIGS. 3A and 4, each vane stage comprises a plurality of vane airfoils 301 that are connected by an inner vane platform 302 and an outer vane platform 303. The first vane stage is the hottest of the vane stages since it is the closest to the combustor outlet and is likely to be the most distressed. Further, the leading edge 304 of vane airfoil 301 of the first vane stage is the hottest portion of the first vane stage. Furthermore, in various embodiments and with reference to FIGS. 3A and 3B, a combustor may comprise multiple rails extend from an outer wall of an outer liner to an aft heat shield panel 405. The multiple rails may include one or more side rails, a forward rail, and an aft combustor rail 400. The aft combustor rail 400 may be positioned very close to the outer vane platform 303 of the first vane stage. For example, the aft combustor rail 400 may be about 0.5 inches (~1.25 cm) from the outer vane platform 303.

Moreover, in accordance with various embodiments, a plurality of holes 401 may be machined into the aft combustor rail 400. The focused air from the plurality of holes 401 may flow onto the outer vane platform 303 and may create a film over the outer vane platform 303 and individual vane airfoils 301 of the first vane stage. Moreover, in various embodiments, the plurality of holes 401 may be designed to create film cooling in order to direct airflow to stagnant air pockets along the first vane. The plurality of holes 401 machined into the aft combustor rail 400 may be designed to focus more coolant onto areas of first vane distress, such as through angles, as compared to slots or other formations in the railing or panels that do not allow directing of the airflow. In various embodiments, the airflow through the angled holes may act more like impingement jets than a film cooling and penetrate farther from the plurality of holes 401. The directed cooling may be beneficial in order to cool the vane airfoil leading edge 304 rather than the aft panel.

In accordance with various embodiments, the plurality of holes 401 may be parallel to the aft heat shield panel 405, or may be angled up, down, or side-to-side. Stated differently, an angle alpha (α) between a centerline 490 of the plurality of holes 401 and the aft heat shield panel 405 may be zero (i.e., the plurality of holes 401 may be parallel to the aft heat shield panel 405) or may be non-zero (i.e., the plurality of holes 401 may be non-parallel to the aft heat shield panel 405). The plurality of holes 401 may comprise circular-shaped holes. In various embodiments, the plurality of holes 401 may comprise elliptical-shaped holes. With reference to FIG. 4, the plurality of holes 401 may comprise multiple holes on the same plane or on different planes. In other words, the holes may be located along a common plane, such as along the center line of the aft combustor rail 400, or the holes may be located at various heights of the aft combustor rail 400. Similarly, in various embodiments, each hole of the plurality of holes 401 may have the same angle relative to the aft combustor rail 400. In further embodiments, one or more holes of the plurality of holes 401 may have different angles relative to the aft combustor rail 400. For example, an angle theta ("θ") of a hole relative to the aft combustor rail 400 may range between 90° to 20°. Furthermore, the plurality of holes 401 may be angled to converge the airflow to a focused area, such as a leading edge of a vane airfoil. In various embodiments, the angle of the hole may be close to 90° to maximize penetration of the airflow.

Figure 5:
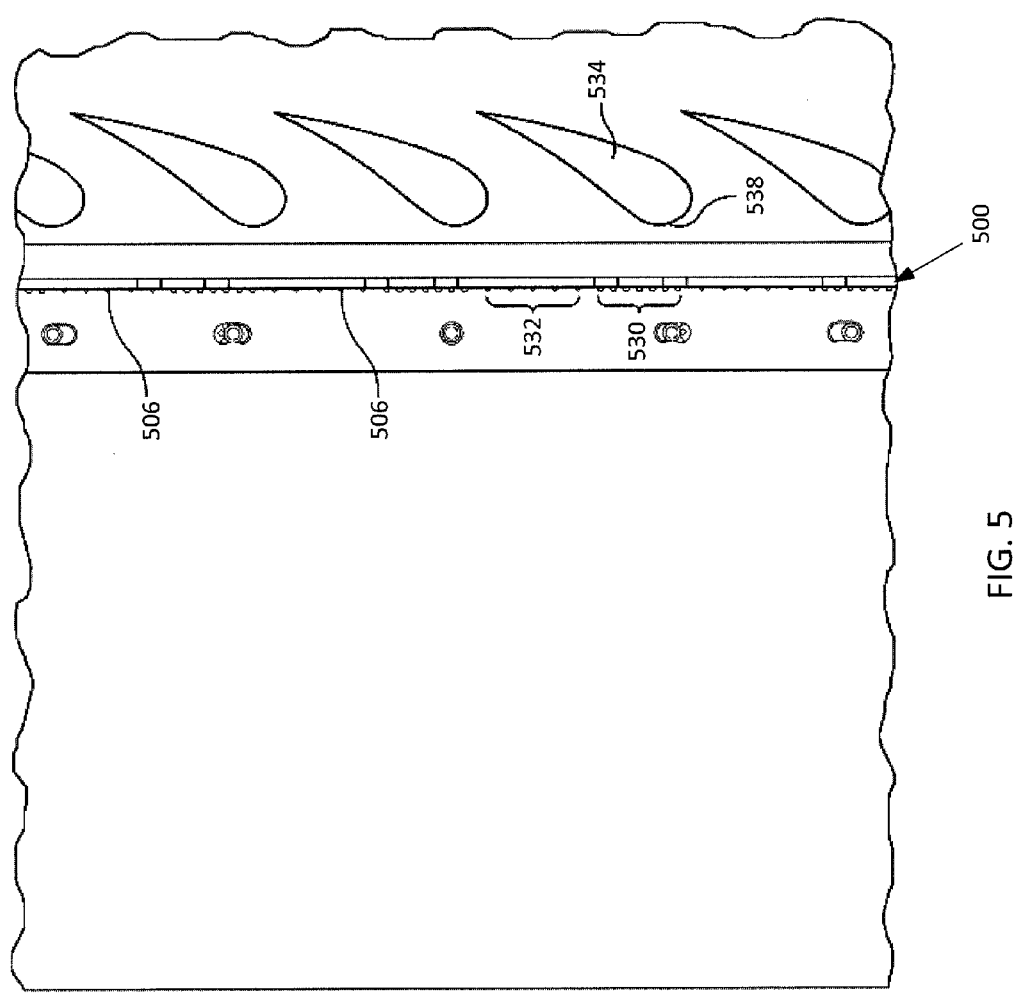
FIG. 5 is an exterior view of a portion of a shell of an exemplary combustor in accordance with various embodiments.

Moreover, in various embodiments and with reference to FIG. 5, aft combustor rail 500 may comprise multiple arrays, or groupings, of holes 506 along the rail. An exemplary first hole array 530 may be positioned ahead of the leading edge 538 of the vane airfoil 534. The first hole array 530 may be centered slightly toward the pressure side of the vane airfoil 534. Further, an exemplary second hole array 532 may be positioned between two adjacent vane airfoils. In various embodiments, the circumferential spacing of vanes 534 is much smaller than that of the fuel injectors and, accordingly, the circumferential length of the pairs of hole arrays are correspondingly smaller. Thus, for example, the circumferential span of the first hole array 530 and the second hole array 532 may be nearly equal. Flow concentration is achieved, in the exemplary embodiment, by having larger cross-section holes in the first hole array 530 as well as having a smaller on-center spacing in that array. In various embodiments, an exemplary diameter for the holes 506 of the arrays 530, 532 may be approximately 25 mils (0.635 mm) for aft combustor rail 500. Further, in various embodiments, an exemplary diameter for the holes 506 of the arrays 530, 532 may be in the range of approximately 1 mils (0.0254 mm) to 100 mils (2.54 mm) for aft combustor rail 500. Moreover, in various embodiments, the angle and spacing of first hole array 530 and/or the second hole array 532 may create swirling fluid flow about vane airfoil 534.

Additionally, in various embodiments, the length-to-diameter ratio of each hole of the plurality of holes should be also minimized to minimize the heat pick up of the coolant air. Accordingly, a short length-to-diameter ratio reduces the heat pick up. The length-to-diameter ratio also affects the ability to direct the airflow. In various embodiments, the length-to-diameter ratio may range from about 1:2 to about 1:100 and from about 1:10 to about 1:50. Additionally, in various embodiments, one or more of the holes 506 may have rifling in the interior surface.

In accordance with the various embodiments described herein, a first stage vane may be cooled in part by directing airflow through a plurality of holes in an aft combustor rail. With renewed reference to FIG. 3B, the directed air, which is a cooling airflow relative to the temperature of the first vane stage, may be diverted from an outer annular chamber 92, through the plurality of holes 401, and directed towards the first vane stage. Furthermore, in various embodiments, cooling holes may not be located in the vane platform, as sufficient cooling may be provided through the aft combustor rail. Diverting airflow from the outer combustion section may provide an increased pressure difference between the outer annular chamber 92 to the combustion outlet as compared to the pressure difference between the aft panel cavity to the combustion outlet. For example, the combustor cooling air is about 1.5% to 7% higher pressure than the combustor chamber pressure. In addition, in various embodiments, diverting airflow from the outer combustion chamber may be more power efficient as the velocity of the outer combustion chamber airflow may be similar to the velocity of the combustion chamber airflow. Mixing high speed air and low speed air leads to mixing losses, so it is typically more efficient to mix airflows with similar speeds. For example, the outer combustion chamber airflow may be flowing at about 0.5 Mach (~170.15 m/s) velocity to about 0.8 Mach (~272.23 m/s) velocity, similar to the combustion chamber airflow velocity. This is closer than the airflow velocity of cooling air available from the turbine section.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A gas turbine engine combustor comprising:
   an aft combustor rail connected between an outer wall of an outer liner and an aft heat shield panel, wherein the aft combustor rail is positioned near an outer vane platform of a first vane stage of a turbine; and
   a plurality of holes in the aft combustor rail, wherein the plurality of holes is configured to focus pass-through airflow onto the outer vane platform,
   wherein each hole of the plurality of holes is angled between 20° and 90° in a circumferential direction relative to the aft combustor rail to converge the pass-through airflow to a focused area, wherein the focused area is a leading edge of a vane airfoil of the first vane stage.

2. The gas turbine engine combustor of claim 1, wherein the plurality of holes are parallel to the aft heat shield panel.

3. The gas turbine engine combustor of claim 1, wherein the plurality of holes is angled non-parallel to the aft heat shield panel.

4. The gas turbine engine combustor of claim 1, wherein each hole of the plurality of holes is circular-shaped.

5. The gas turbine engine combustor of claim 1, wherein one or more holes of the plurality of holes is elliptical-shaped.

6. The gas turbine engine combustor of claim 5, wherein one or more holes of the plurality of holes has a diameter in a range of approximately 1 mil to 100 mils.

7. The gas turbine engine combustor of claim 5, wherein one or more holes of the plurality of holes has a length-to-diameter ratio of 1:10.

8. The gas turbine engine combustor of claim 5, wherein the pass-through airflow through the plurality of holes is diverted from an outer annular chamber of the gas turbine engine combustor.

9. A gas turbine engine combustor comprising:
   an aft combustor rail connected between an outer wall of an outer liner and an aft heat shield panel, wherein the aft combustor rail is positioned near an outer vane platform of a first vane stage of a turbine;
   a first array of circumferentially displaced holes formed through the aft combustor rail, wherein the first array of holes is circumferentially offset in a first circumferential direction from a leading edge of a turbine vane of the first outer vane platform and the first array of holes is angled in a second circumferential direction, the second circumferential direction opposed to the first circumferential direction, to direct pass-through airflow towards the leading edge; and
   a second array of circumferentially displaced holes formed through the aft combustor rail, wherein second array of holes is circumferentially offset in the second circumferential direction from the leading edge and angled in the first circumferential direction to direct pass-through airflow towards the leading edge.

10. The gas turbine engine combustor of claim 9, wherein the first array of circumferentially displaced holes and the second array of circumferentially displaced holes direct the pass-through airflow to a focused area.

11. The gas turbine engine combustor of claim 10, wherein the focused area of the first array of circumferentially displaced holes is a pressure side of the turbine vane.

12. The gas turbine engine combustor of claim 9, wherein a spacing of multiple holes of the second array of circumferentially displaced holes is greater than a spacing of the multiple holes of the first array of circumferentially displaced holes.

13. The gas turbine engine combustor of claim 9, wherein each hole of the first array of circumferentially displaced holes is angled between 20°-90° relative to the aft combustor rail.

14. The gas turbine engine combustor of claim 9, wherein one or more holes of the first array of circumferentially displaced holes has a diameter in a range of approximately 1 mil to 100 mils.

15. The gas turbine engine combustor of claim 9, wherein one or more holes of the first array of circumferentially displaced holes has a length-to-diameter ratio of 1:10.

16. The gas turbine engine combustor of claim 9,
   wherein a spacing of multiple holes of the second array of circumferentially displaced holes is greater than a spacing of the multiple holes of the first array of circumferentially displaced holes,
   wherein each hole of the first array of circumferentially displaced holes is angled between 20° and 90° relative to the aft combustor rail,
   wherein the angle and the spacing of holes of at least one of the first array of circumferentially displaced holes and the second-array of circumferentially displaced holes creates swirling airflow about the vane airfoil.

* * * * *